US010721788B2

United States Patent
Ogawa et al.

(10) Patent No.: US 10,721,788 B2
(45) Date of Patent: Jul. 21, 2020

(54) ELECTRONIC APPARATUS, COMMUNICATION SYSTEM, AND WIRELESS COMMUNICATION METHOD

(71) Applicant: SEIKO EPSON CORPORATION, Tokyo (JP)

(72) Inventors: Yohei Ogawa, Shiojiri (JP); Kenji Sakuda, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 86 days.

(21) Appl. No.: 16/130,728

(22) Filed: Sep. 13, 2018

(65) Prior Publication Data

US 2019/0090296 A1 Mar. 21, 2019

(30) Foreign Application Priority Data

Sep. 15, 2017 (JP) ................. 2017-177371

(51) Int. Cl.
| | | |
|---|---|---|
| *H04W 4/00* | (2018.01) | |
| *H04W 76/15* | (2018.01) | |
| *G06F 3/12* | (2006.01) | |
| *H04W 76/14* | (2018.01) | |
| *H04W 76/11* | (2018.01) | |
| *H04W 76/30* | (2018.01) | |
| *H04W 76/18* | (2018.01) | |

(52) U.S. Cl.
CPC .......... *H04W 76/15* (2018.02); *G06F 3/1203* (2013.01); *G06F 3/1236* (2013.01); *G06F 3/1292* (2013.01); *H04W 76/11* (2018.02); *H04W 76/14* (2018.02); *H04W 76/18* (2018.02); *H04W 76/30* (2018.02)

(58) Field of Classification Search
CPC ..... H04W 76/15; H04W 76/18; H04W 76/30; H04W 76/14; H04W 76/11; G06F 3/1203; G06F 3/1236; G06F 3/1292
See application file for complete search history.

(56) References Cited

U.S. PATENT DOCUMENTS

2007/0184863 A1* 8/2007 Takagi ................ H04W 52/281
455/507
2013/0148162 A1* 6/2013 Park ................... H04N 1/00214
358/1.15

(Continued)

FOREIGN PATENT DOCUMENTS

JP 2015-070556 A 4/2015

*Primary Examiner* — Stephen M D Agosta
(74) *Attorney, Agent, or Firm* — Foley & Lardner LLP

(57) ABSTRACT

An electronic apparatus includes a wireless communication unit which performs wireless communication, and a processing unit which controls the communication of the wireless communication unit. In a state in which the wireless communication unit performs wireless connections with a plurality of terminal apparatuses (existing connection terminals) and the wireless communication unit starts a wireless connection with a new connection terminal, which is different from the plurality of terminal apparatuses, the processing unit cuts the wireless connections with the plurality of terminal apparatuses, and establishes the wireless connections with the plurality of terminal apparatuses after waiting for establishment of the wireless connection with the new connection terminal.

8 Claims, 5 Drawing Sheets

(56) References Cited

U.S. PATENT DOCUMENTS

| | | | |
|---|---|---|---|
| 2013/0223279 A1* | 8/2013 | Tinnakornsrisuphap | ................... H04L 41/0809 370/254 |
| 2015/0092231 A1 | 4/2015 | Shibata | |
| 2015/0092607 A1* | 4/2015 | Ando | ................. H04L 41/0893 370/255 |
| 2015/0163300 A1* | 6/2015 | Kumar | ................ H04L 67/1046 709/205 |
| 2015/0334581 A1* | 11/2015 | Minakawa | ............ H04W 40/24 370/254 |

* cited by examiner

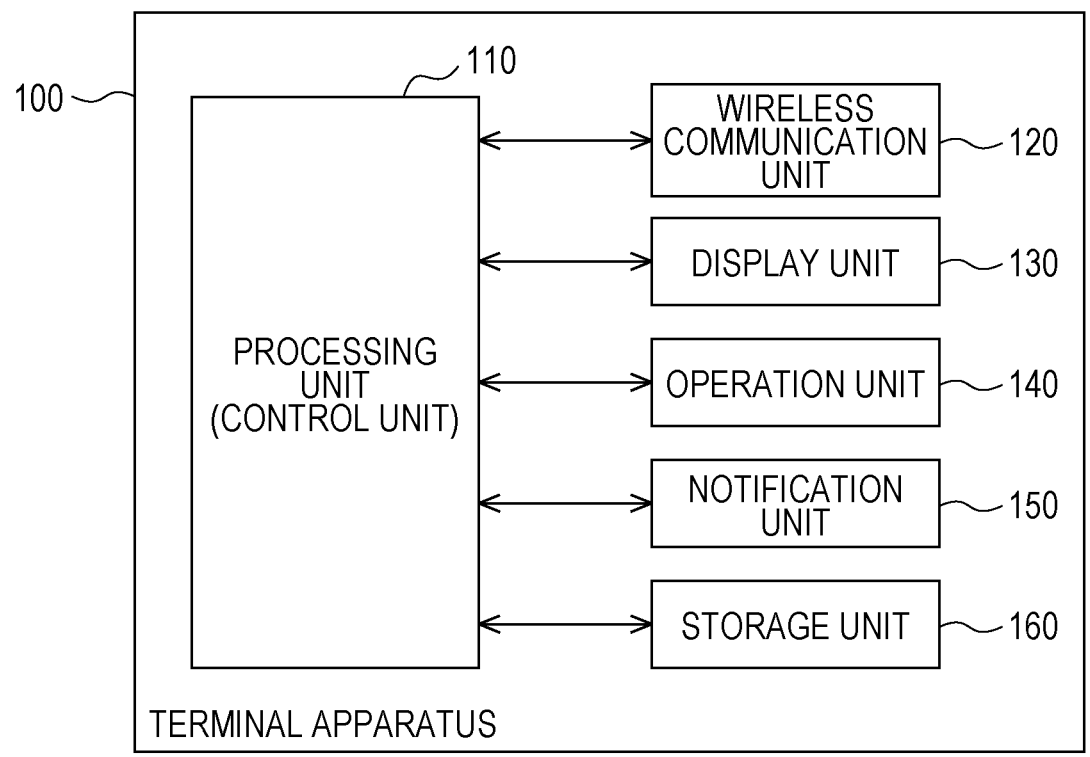
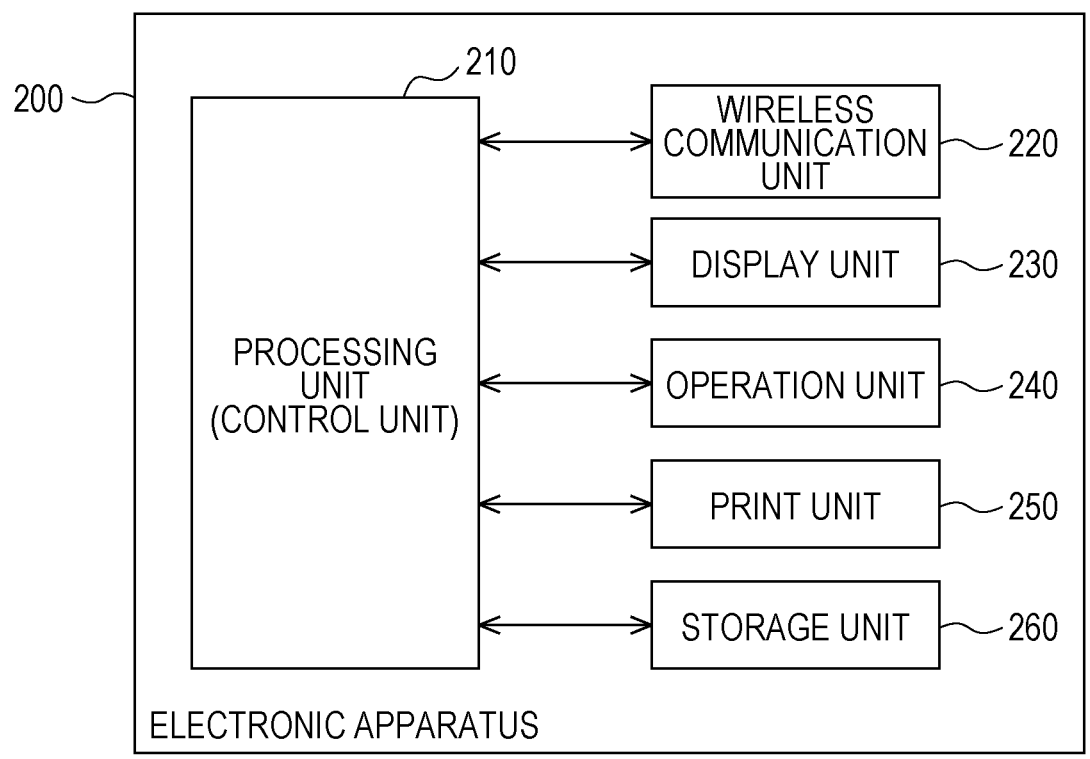

ELECTRONIC APPARATUS, COMMUNICATION SYSTEM, AND WIRELESS COMMUNICATION METHOD

BACKGROUND

1. Technical Field

The present invention relates to an electronic apparatus, a communication system, a wireless communication method, and the like.

2. Related Art

A standard referred to as Wi-Fi Direct (WFD) is known in which direct Wi-Fi (registered trademark) connection is performed between a terminal apparatus and an electronic apparatus (for example, a printer) without passing through an external access point. In the WFD, for example, the printer activates an access point for the WFD, and the access point for the WFD functions as an external access point.

In the WFD, the upper limit number of devices, which are capable of simultaneously connecting to one electronic apparatus (one access point for the WFD), is set. JP-A-2015-70556 discloses a control method in a case where connection demands are performed from terminal apparatuses, the number of which is larger than the upper limit number. In JP-A-2015-70556, in a state in which the number of wireless connections established by the printer reaches the upper limit number and the wireless connection demand is received from a new terminal, any one wireless connection among the established wireless connections is cut and a wireless connection with the new terminal is established.

In order to perform a WFD connection, it is necessary to perform an operation of selecting a proper SSID in the terminal apparatus, and it is complicated for a user who is not used to an operation of the terminal apparatus. Here, in order to easily establish the WFD connection (the connection), first, a method is used for performing a temporary connection using an access point for the temporary connection and transmitting the SSID for the WFD from the electronic apparatus to the terminal apparatus in the temporary connection.

However, in a case where the method is realized in an electronic apparatus in which only one wireless communication device (wireless chip) is mounted, it is necessary to stop the access point for the WFD connection once and to cut all existing wireless communications. In a state in which the number of WFD connections between the electronic apparatus and the terminal apparatus reaches an upper limit value (for example, four) and the new terminal uses the temporary connection, all the WFD connections are cut once, and, thereafter, the terminal apparatuses corresponding to (upper limit number+1) attempt the WFD connection with the electronic apparatus by order of arrival. Therefore, it is not limited that the new terminal, which uses the temporary connection, necessarily performs the WFD connection with the electronic apparatus.

In the method disclosed in JP-A-2015-70556, in a case where the number of wireless connections exceeds the upper limit number, the wireless connection with the new terminal is performed by cutting one existing wireless connection. Therefore, in a case where it is premised that all the WFD connections are cut once by using the temporary connection, it is not possible to use the method disclosed in JP-A-2015-70556.

SUMMARY

An advantage of some aspects of the invention is to provide an electronic apparatus, a communication system, and a wireless communication method, which performs a wireless connection with a new connection terminal in a high reliability state in a case where an existing wireless connection is cut once.

According to an aspect of the invention, there is provided an electronic apparatus including: a wireless communication unit that performs wireless communication; and a processing unit that controls the communication of the wireless communication unit, in which, in a state in which the wireless communication unit performs wireless connections with a plurality of terminal apparatuses and the wireless communication unit starts a wireless connection with a new connection terminal, which is different from the plurality of terminal apparatuses, the processing unit cuts the wireless connections with the plurality of terminal apparatuses, and establishes the wireless connections with the plurality of terminal apparatuses after waiting for establishment of the wireless connection with the new connection terminal.

In this case, due to the start of the wireless connection with the new connection terminal, once, the wireless connections with the plurality of terminal apparatuses is cut, and reconnections with the plurality of terminal apparatuses are performed after waiting for the establishment of the wireless connection with the new connection terminal. In this manner, even in a case where existing wireless connections with the plurality of terminal apparatuses are cut, it is possible to securely perform the establishment of the wireless connection with the new connection terminal.

In addition, in the electronic apparatus, the processing unit may stop a first internal access point used for the wireless connections with the plurality of terminal apparatuses in a case where the wireless connection with the new connection terminal is started, may acquire identification information of the new connection terminal using wireless connection performed by a second internal access point in a case where the second internal access point, which is different from the first internal access point, is activated, and may reactivate the first internal access point and establishes the wireless connection with the new connection terminal based on the identification information.

In this manner, in a case where the identification information is acquired in the wireless connection using the second internal access point and the identification information is used for the wireless connection in the first internal access point, it is possible to perform the wireless connection with the new connection terminal prior to other terminal apparatuses.

In addition, in the electronic apparatus, the processing unit may refuse the wireless connections with the plurality of terminal apparatuses until the wireless connection with the new connection terminal is established based on the identification information after the first internal access point is reactivated.

In this manner, it is possible to perform the wireless connection with the new connection terminal prior to other terminal apparatuses.

In addition, in the electronic apparatus, the processing unit may allow the wireless connections with the plurality of terminal apparatuses to be established even before the wireless connection with the new connection terminal is established in a case where a given condition is satisfied.

In this manner, even in a case where abnormities are generated in the wireless connection with the new connection terminal, it is possible to appropriately perform reconnection with the plurality of terminal apparatuses.

In addition, in the electronic apparatus, the given condition may be satisfied in a case where elapsed time, which is taken from predetermined timing after the first internal access point is reactivated to timing at which the wireless connection with the new connection terminal is established, exceeds a threshold, or in a case where a degree, in which the terminal apparatuses perform connection demands with respect to the electronic apparatus after the first internal access point is reactivated, exceeds the threshold.

In this manner, it is possible to determine whether or not to allow reconnections with the plurality of terminal apparatuses based on a proper condition.

In addition, in the electronic apparatus, the wireless communication may be Wi-Fi Direct (WFD) type communication.

In this manner, it is possible to appropriately perform the wireless connection in conformity to a WFD standard.

In addition, in the electronic apparatus, in a state in which the terminal apparatuses reaching a maximum number of connections perform the wireless connections with the wireless communication unit and the wireless connection with the new connection terminal is started, the processing unit may perform a process of cutting the wireless connections with the plurality of terminal apparatuses, and establishing the wireless connections with the plurality of terminal apparatuses after waiting for the establishment of the wireless connection with the new connection terminal, and, in a state in which the terminal apparatuses reaching the maximum number of connections may not perform the wireless connections with the wireless communication unit and the wireless connection with the new connection terminal is started, the processing unit may not perform the process.

In this manner, it is possible to switch between appropriately processes depending on whether or not the number of existing wireless connections reaches the maximum number of connections. For example, in a situation in which the number of existing wireless connections reaches the maximum number of connections and it is difficult to establish the wireless connection with the new connection terminal as it is, it is possible to securely perform the establishment of the wireless connection with the new connection terminal.

According to another aspect, there is provided a communication system including: the electronic apparatus; and the new connection terminal.

According to further another aspect, there is provided a wireless communication method, in a state in which wireless connections with a plurality of terminal apparatuses are established and a wireless connection with a new connection terminal, which is different from the plurality of terminal apparatuses, is started, the method including: cutting the wireless connections with the plurality of terminal apparatuses; and establishing the wireless connections with the plurality of terminal apparatuses after waiting for the establishment of the wireless connection with the new connection terminal.

BRIEF DESCRIPTION OF THE DRAWINGS

The invention will be described with reference to the accompanying drawings, wherein like numbers reference like elements.

FIG. 2 illustrates a configuration example of the terminal apparatus.

FIG. 3 illustrates a configuration example of the electronic apparatus.

DESCRIPTION OF EXEMPLARY EMBODIMENTS

Hereinafter, embodiments will be described. Meanwhile, the embodiments, which will be described below, do not unreasonably limit content of the invention disclosed in claims. In addition, all configurations described in the embodiments are not limited to essential components of the invention.

1. Communication System

Figure 1:
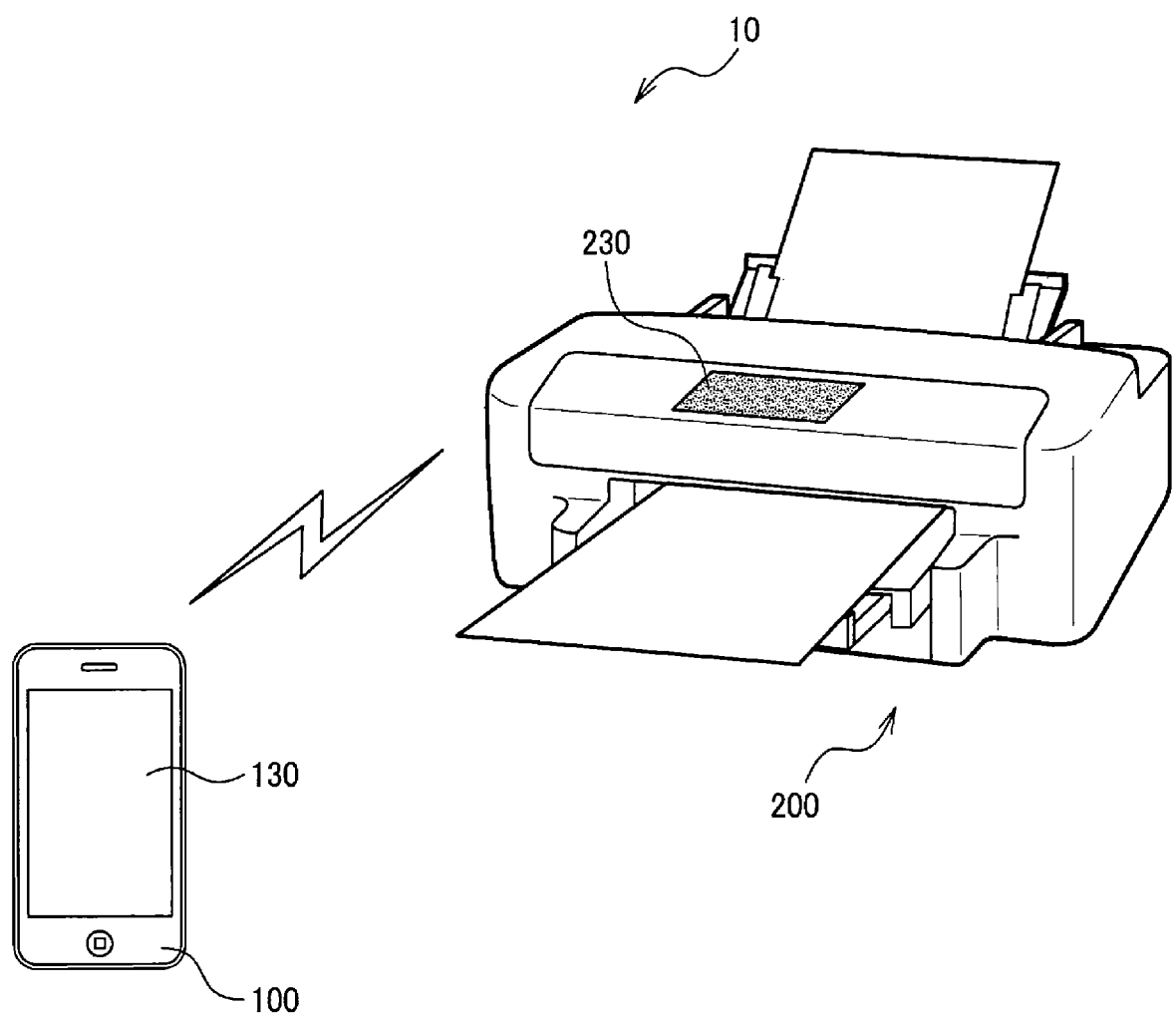
FIG. 1 illustrates a configuration example of a communication system which includes a terminal apparatus and an electronic apparatus.

FIG. 1 is a diagram schematically illustrating an example of a communication system 10 according to the invention. The communication system 10 includes a terminal apparatus 100 and an electronic apparatus 200.

The terminal apparatus 100 may be a portable terminal apparatus, such as a smart phone or a tablet terminal, or may be a device such as a PC. The terminal apparatus 100 includes a new connection terminal 300 and an existing connection terminal 400 which will be described later with reference to FIG. 4. Meanwhile, whether the terminal apparatus 100 is treated as the new connection terminal 300 or the existing connection terminal 400 differs depending on a connection situation with respect to the electronic apparatus 200.

Figure 4:
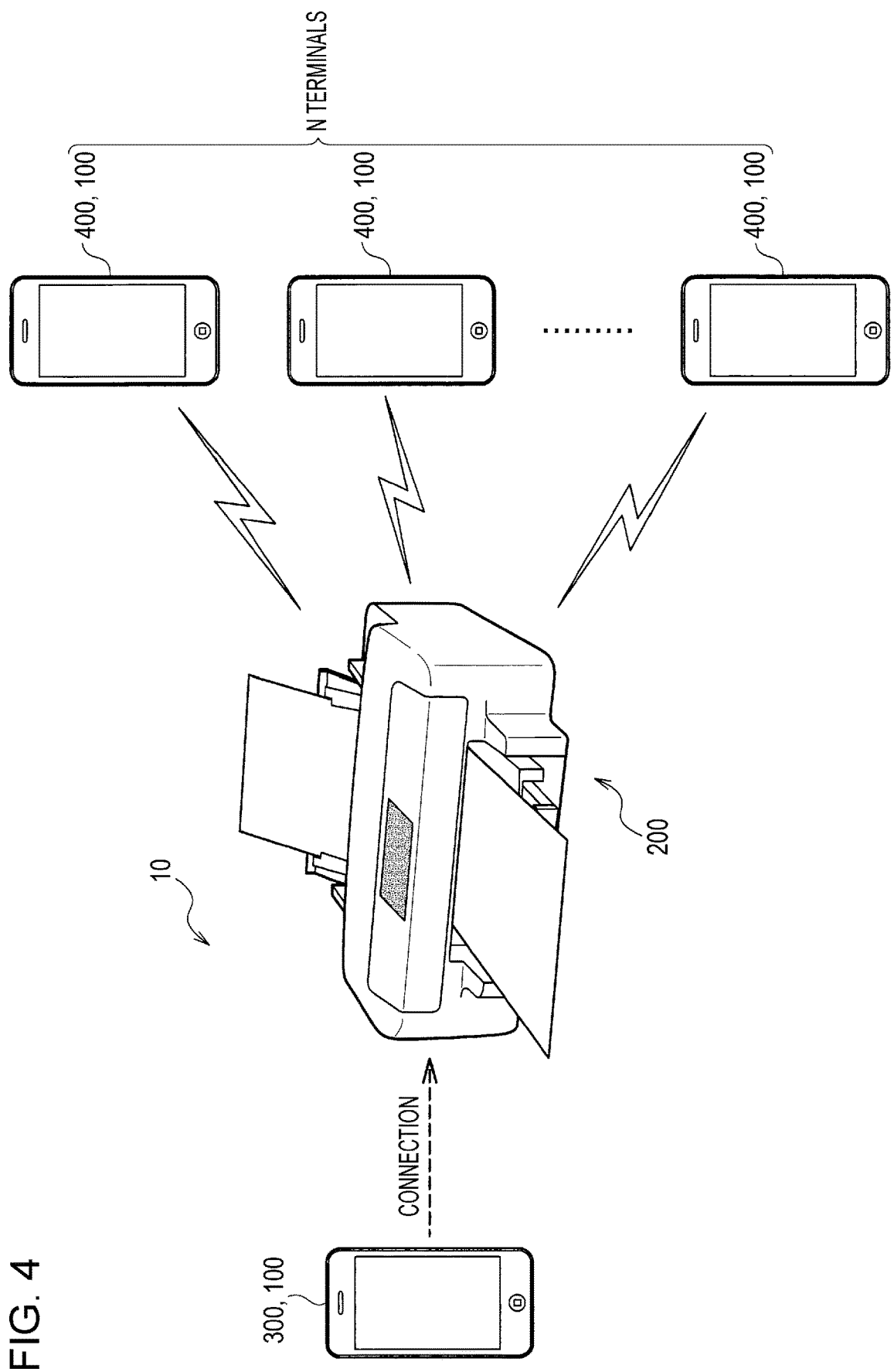
FIG. 4 is a schematic diagram illustrating a new connection terminal and existing connection terminals.

The electronic apparatus 200 is, for example, a printer (print apparatus). Otherwise, the electronic apparatus 200 may be a scanner, a facsimile device, or a copying machine. The electronic apparatus 200 may be a Multifunction Peripheral (MFP), which has a plurality of functions. A multifunction peripheral, which has a print function, is also an example of the printer. Otherwise, the electronic apparatus 200 may be a projector, a head mounted display device, a wearable device (a list type wearable device or the like), a bio-information measurement device (a pulsimeter, a pedometer, an activity meter, or the like), a robot, a video device (a camera or the like), a portable information terminal (a smart phone, a portable game machine, or the like), a physical quantity measurement device, or the like. Meanwhile, the communication system 10 is not limited to the configuration of FIG. 1, and various modified implementations, in which other components are added, are possible. For example, although FIG. 1 illustrates one terminal apparatus 100, it is conceivable that a plurality of terminal apparatuses 100 are connected to one electronic apparatus 200, as illustrated in FIG. 4, in the embodiment. In addition, modifications, such as omission or addition of the components, are possible as the same as in FIGS. 2 and 3 which will be described later.

The terminal apparatus 100 and the electronic apparatus 200 are possible to perform wireless communication. Here, the wireless communication is communication in conformity to a Wi-Fi standard and, more specifically, communication in conformity to a WFD standard. Specifically, one of the terminal apparatus 100 and the electronic apparatus 200 activates an internal access point (a software access point), and a remaining apparatus is connected to the internal access point. Meanwhile, although a WFD connection is described in the embodiment, a configuration, in which the terminal apparatus 100 and the electronic apparatus 200 are capable of connecting to an external access point (for example, a wireless LAN router), respectively, is not obstructed.

FIG. 2 is a block diagram illustrating an example of a configuration of the terminal apparatus 100. The terminal apparatus 100 includes a processing unit 110 (a processor), a wireless communication unit 120 (a communication interface), a display unit 130 (a display), an operation unit 140 (an operation button or the like), a notification unit 150 (a notification interface), and a storage unit 160 (a memory).

The processing unit 110 (the processor or a controller) controls the respective units including the wireless communication unit 120, the display unit 130, the operation unit 140, the notification unit 150, and the storage unit 160.

It is possible for the processor (the processor including hardware) to realize each process (each function), which is performed by the processing unit 110, according to the embodiment. For example, it is possible to realize each process according to the embodiment using the processor which operates based on information, such as a program, and the memory (a storage device) which stores information such as the program. Here, the processor may cause, for example, functions of the respective units to be realized by individual hardware or the functions of the respective units to be realized by integrated hardware. For example, the processor includes hardware, and it is possible for the hardware to include at least one of a circuit which processes a digital signal and a circuit which processes an analog signal. For example, it is possible to form the processor using one or more circuit devices (for example, an IC or the like), which are mounted on a circuit substrate, or using one or more circuit elements (for example, a resistor, a capacitor, and the like). The processor may be, for example, a CPU. However, the processor is not limited to the CPU, and it is possible to use various processors such as a Graphics Processing Unit (GPU) and a Digital Signal Processor (DSP). In addition, the processor may be a hardware circuit using ASIC. In addition, the processor may include a plurality of CPUs, or may include a hardware circuit using a plurality of ASICs. In addition, the processor may include a combination of the plurality of CPUs and the hardware circuit using the plurality of ASICs.

The wireless communication unit 120 is realized by at least one communication device (a wireless communication device). The wireless communication unit 120 includes the wireless communication device (a wireless communication chip) which performs the wireless communication in conformity to the Wi-Fi standard. However, the wireless communication unit 120 may include a wireless communication device which performs the wireless communication in conformity to a standard other than the Wi-Fi standard. The standard other than the Wi-Fi standard may be, for example, Bluetooth (registered trademark) or, in a narrow sense, Bluetooth Low Energy (BLE).

The display unit 130 includes a display or the like, which displays various pieces of information to a user, and the operation unit 140 includes a button or the like which receives an input operation from the user. Meanwhile, the display unit 130 and the operation unit 140 may be formed integrally by, for example, a touch panel. The notification unit 150 provides a notification with respect to the user. The notification unit 150 may be, for example, a speaker which provides a notification using sounds, a vibration unit (a vibration motor) which provides a notification using vibration, or a combination thereof.

The storage unit 160 (the storage device or the memory) stores various pieces of information such as the data or the program. The processing unit 110 and the wireless communication unit 120 operate while using, for example, the storage unit 160 as a work area. The storage unit 160 may be a semiconductor memory, such as an SRAM or a DRAM, may be a register, may be a magnetic storage device such as a Hard Disk Device (HDD), or may be an optical storage device such as an optical disk device. For example, the storage unit 160 stores a computer-readable command. In a case where the command is executed by the processing unit 110 (processor), the function of each of the units (the communication unit and the processing unit) of the terminal apparatus 100 is realized. Here, the command may be a command of a command set which forms the program, or may be a command which instructs an operation with respect to the hardware circuit of the processing unit 110 (processor). In addition, the terminal apparatus 100 includes an imaging unit (camera) which is not illustrated in the drawing, and the storage unit 160 stores image data (including a still image and a moving picture) which is imaged by the imaging unit.

FIG. 3 is a block diagram illustrating an example of a configuration of the electronic apparatus 200. Meanwhile, FIG. 3 illustrates the electronic apparatus 200 (printer) which has a print function. In the description below, an example in which the electronic apparatus 200 is a printer will be described. However, a fact that it is possible to extend the electronic apparatus 200 to an apparatus other than the printer is as described above. The electronic apparatus 200 includes a processing unit 210 (a processor), a wireless communication unit 220 (a communication interface), a display unit 230 (a display), an operation unit 240 (an operation panel), a print unit 250, and a storage unit 260 (a memory).

The processing unit 210 (a processor or a controller) controls each of the units (the wireless communication unit, the storage unit, the print unit or the like) of the electronic apparatus 200, or performs various processes according to the embodiment. For example, it is possible for the processing unit 210 to include a plurality of CPUs (an MPU and a microcomputer) such as a main CPU and a sub CPU. The main CPU (a main control substrate) controls each of the units or the whole units of the electronic apparatus 200. For example, in a case where the electronic apparatus 200 is the printer, the sub CPU performs various processes for print. Otherwise, a CPU for the communication process may be further provided.

It is possible for the processor (the processor including hardware) to realize each process (each function), which is performed by the processing unit 210, according to the embodiment. For example, it is possible to realize each process according to the embodiment using the processor which operates based on information, such as a program, and using the memory (a storage device) which stores the information such as the program. Here, the processor may cause, for example, functions of the respective units to be realized by individual hardware or the functions of the respective units to be realized by integrated hardware. For example, the processor includes the hardware, and it is possible for the hardware to include at least one of a circuit which processes a digital signal and a circuit which processes an analog signal. For example, it is possible for the processor to include one or more circuit devices (for example, ICs or the like), which are mounted on a circuit substrate, or one or more circuit elements (for example, a resistor, a capacitor or the like). The processor may be, for example, a CPU. However, the processor is not limited to the CPU, and it is possible to use various processors such as a Graphics Processing Unit (GPU) and a Digital Signal Processor (DSP). In addition, the processor may be a hardware circuit using ASIC. In addition, the processor may include a plurality of CPUs, or may include a hardware circuit using a plurality of ASICs. In addition, the processor may include a combination of the plurality of CPUs and the hardware circuit using the plurality of ASICs.

The wireless communication unit 220 is realized by at least one communication device (a wireless communication device). The wireless communication unit 220 includes a wireless communication device (a wireless communication chip) which performs the wireless communication in conformity to the Wi-Fi standard. However, the wireless communication unit 220 may include a wireless communication device which performs the wireless communication in conformity to a standard other than the Wi-Fi standard.

The display unit 230 includes a display or the like which displays various pieces of information to the user, and the operation unit 240 includes a button or the like which receives an input operation from the user. Meanwhile, the display unit 230 and the operation unit 240 may be formed integrally by, for example, the touch panel.

The print unit 250 includes a print engine. The print engine has a mechanical configuration used to print an image on a print medium. For example, the print engine includes a transfer mechanism, an ink jet-type discharge head, a carriage drive mechanism which includes the discharge head, and the like. The print engine discharges ink from the discharge head with respect to the print medium (paper or cloth) which is transported by the transfer mechanism, thereby printing an image on the print medium. Meanwhile, a detailed configuration of the print engine is not limited to the example illustrated here, and the print may be performed with toner using a laser method. In addition, the print unit 250 may include a sensor which detects various physical quantities relevant to a work state of the print engine, a counter which counts a result of the detection, and the like. In a case where the sensor and the counter are used, it is possible to acquire, for example, pieces of information such as a drive quantity of the transfer mechanism (a rotation quantity of the motor), the number of times of reciprocation of the discharge head, and the amount of ink consumption.

The storage unit 260 (the storage device or the memory) stores various pieces of information such as the data and the program. The processing unit 210 and the wireless communication unit 220 operate while using, for example, the storage unit 260 as a work area. The storage unit 260 may be a semiconductor memory, a register, a magnetic storage device, or an optical storage device. The storage unit 260 stores data, which is output from the print unit 250, as information which indicates a work situation of the printer.

In addition, the storage unit 260 (store device) may store data which is transmitted from the terminal apparatus 100 through the wireless communication. Here, the data is, for example, print data which is used for print in the print unit 250. However, the storage of the data from the terminal apparatus 100 is not limited to the storage performed in the storage unit 260 which is embedded in the electronic apparatus 200. For example, the electronic apparatus 200 may include an interface which is not illustrated in the drawing, and the data from the terminal apparatus 100 may be stored in an external storage device which is connected through the interface. The external storage device may be, for example, an HDD, a Solid State Drive (SSD), and a flash memory which are connected through a Universal Serial Bus (USB), may be an SD card (including a storage device in conformity to a standard relevant to a micro SD card or the like) which is inserted into a card slot, or may be another storage device which is capable of connecting to the electronic apparatus 200.

2. Details of Process

FIG. 4 is a schematic diagram illustrating a connection state which is conceivable in the embodiment. The electronic apparatus 200 performs wireless connections with N terminal apparatuses 100 (existing connection terminals 400) through the internal access point which is activated by the wireless communication unit 220. Meanwhile, the wireless communication according to the embodiment is Wi-Fi Direct (WFD)-type communication, and the internal access point is an internal access point for the WFD connection. However, the wireless connection according to the embodiment may be considered by extending to another communication standard. Hereinafter, the internal access point, which is used for a connection with the existing connection terminal 400, is expressed as a first internal access point. In addition, here, the internal access point is an access point which is activated by any one of the wireless communication units of two apparatuses (the terminal apparatus 100 and the electronic apparatus 200) which are directly connected, and is an access point which is different from the external access point activated by an external device (for example, a wireless LAN router) other than the apparatuses. In the embodiment, the first internal access point and a second internal access point are activated by the wireless communication unit 220 of the electronic apparatus 200.

In addition, here, N is a value which indicates an upper limit number of the WFD connection. It is possible for the electronic apparatus 200 to simultaneously receive connections from N terminal apparatuses 100 using the first internal access point. For example, although N=4, it is possible to perform various modification on a detailed numerical value of N.

In addition, the existing connection terminal 400 indicates the terminal apparatus 100 in which wireless connection with the electronic apparatus 200 is already established in a case where a connection operation of a new terminal apparatus 100 (new connection terminal 300) using temporary connection, which will be described later, is started. The existing connection terminal 400 may be an apparatus which is capable of performing the wireless connection (the WFD connection) with the electronic apparatus 200, may be an apparatus (an apparatus which is capable of performing the temporary connection) which may be the new connection terminal 300 according to the embodiment, and may be an apparatus (an apparatus which does not perform the temporary connection) which is not conceivable to be the new connection terminal 300.

In such a situation, it is assumed that an operation is performed of connecting the terminal apparatus 100, which performs the wireless connection with the electronic apparatus 200 up to that time, to the electronic apparatus 200 using the temporary connection. Hereinafter, in order to distinguish the terminal apparatus 100 whose connection is newly started from the existing connection terminal 400, the terminal apparatus 100 is expressed as the new connection terminal 300. In this case, the number of terminals connected to the first internal access point already reaches the upper limit number. Therefore, it is not possible to establish the wireless connection between the new connection terminal 300 and the electronic apparatus 200 as it is.

Here, the new connection terminal 300 is an apparatus, in which the connection operation performed by the user is being progressing, and it is assumed that the user is desired to transmit and receive data between the new connection terminal 300 and the electronic apparatus 200. For example, in a case where the electronic apparatus 200 is the printer, it is possible to assume that the user performs the connection operation in order to print data, such as a picture, which is maintained in the new connection terminal 300 using the printer. Compared to that, there is a possibility that N existing connection terminals 400 include an apparatus in which transmission and reception of necessary data is already completed at past timing and which has low necessity for maintaining establishment of the wireless connection.

That is, in the situation illustrated in FIG. 4, it is desired for the electronic apparatus 200 to perform the wireless connection with the new connection terminal 300, to which a connection is newly attempted, prior to the existing connection terminal 400.

In the embodiment, it is conceivable to use the temporary connection in order to improve convenience of the user. Here, the temporary connection is connection for transmission and reception of connection information corresponding to information, which is used to establish the connection, transmission and reception of information other than the connection information is not conceivable. The connection information is information, which includes identification information (SSID of the first internal access point) and password of an access point for the connection. The connection indicates connection used to receive information, which is different from the connection information, for example, information (print data), which is a processing target of the electronic apparatus 200, from the terminal apparatus 100.

In a case where the temporary connection is not used, for example, in a case where the user selects the SSID of the first internal access point from an SSID list screen displayed on the display unit 130 of the terminal apparatus 100 after the first internal access point is started by the electronic apparatus 200, the connection (the WFD connection) is performed between the terminal apparatus 100 and the electronic apparatus 200. However, an operation of opening the screen on which the SSID is displayed and an operation of selecting the SSID are complicated for the user who is not used to the operation of the terminal apparatus 100, thereby being short of convenience. In a case where the temporary connection is used, information, such as the SSID, is transmitted to the terminal apparatus 100 through the temporary connection, and thus an operation of selecting the SSID for the connection on the terminal apparatus 100 by the user is not necessary.

However, in a case where the cost of the electronic apparatus 200 is taken into consideration, there are many cases where it is difficult for the wireless communication unit 220 to include a plurality of wireless communication devices (a plurality of Wi-Fi chips) in conformity to a Wi-Fi communication standard. In a case where the number of wireless communication devices is one, it is not possible to simultaneously start the internal access point (the first internal access point) for connection and the internal access point (hereinafter, expressed as the second internal access point) for the temporary connection. Therefore, in a case where one of the internal access points is activated, it is necessary to stop remaining internal access points.

That is, in a situation which is conceivable in the embodiment, in a case where a connection demand of the new connection terminal 300 is received, the first internal access point is stopped in order to perform the temporary connection, and all the wireless connections of N existing connection terminals 400 are cut. In a case where the transmission and reception of the connection information through the temporary connection are completed and the first internal access point is reactivated, all the N existing connection terminals 400 and the new connection terminal 300 simultaneously perform connection demands with respect to the first internal access point. In this case, for example, N terminal apparatuses 100 perform the wireless connections with the electronic apparatus 200 in order of early connection demands, and the wireless connection between the new connection terminal 300 and the electronic apparatus 200 is not realized depending on an order of the connection demands.

In the method disclosed in JP-A-2015-70556, the wireless connection between the new connection terminal 300 and the electronic apparatus 200 is realized by cutting the wireless connection with one of N existing connection terminals 400 and leaving an empty space corresponding to the one connection terminal. The method disclosed in JP-A-2015-70556 does not take the temporary connection into consideration at all, and premises that the previous internal access point (the first internal access point) is activated and continued. In a case where a secure wireless connection is performed with the new connection terminal 300 in a situation which premises that the temporary connection is used, it is difficult to apply the method disclosed in JP-A-2015-70556 as it is.

With respect to the above problem, the electronic apparatus 200 according to the embodiment includes a wireless communication unit 220 which performs the wireless communication, and a processing unit 210 which controls communication of the wireless communication unit 220, as illustrated in FIG. 3. Furthermore, in a state in which the wireless communication unit 220 performs the wireless connections with the plurality of terminal apparatuses 100 (the existing connection terminals 400) and the wireless connection with the new connection terminal 300, which is different from the plurality of terminal apparatuses 100, is started, the processing unit 210 cuts the wireless connections with the plurality of terminal apparatuses 100, and establishes the wireless connections with the plurality of terminal apparatuses 100 after waiting for the establishment of the wireless connection with the new connection terminal 300.

Here, in the electronic apparatus 200, "a case where the wireless connection with the new connection terminal 300 is started" indicates a case where a process, which is performed to attempt a connection with an apparatus that is different from the existing connection terminals 400, is started, and corresponds to, for example, a case where a series of processes, which include a process of stopping the first internal access point and activating the second internal access point, for the temporary connection is started. As will be described later with reference to FIG. 5, in a case where it is considered that a trigger for starting the temporary connection is an operation performed by the user, "the case where the wireless connection with the new connection terminal 300 is started" may indicate a case where a user operation of instructing the temporary connection is performed. Meanwhile, it is conceivable that the electronic apparatus 200 broadcasts an SSID of the second internal access point after the second internal access point is started, and it is possible to receive a broadcast signal in an apparatus other than the new connection terminal 300 which is conceivable for the user. That is, the electronic apparatus 200 may finally establish the connection (the WFD connection) with the new connection terminal 300, and, in "the case where the wireless connection with the new connection terminal 300 is started", it is not necessary to specify an apparatus corresponding to the new connection terminal 300.

As described above, in the embodiment, in a case where the wireless connections with the existing connection terminals 400 are cut because the wireless connection with the new connection terminal 300 is started, reconnections with the existing connection terminals 400 are performed after waiting for the establishment of the wireless connection with the new connection terminal 300. In other words, under a condition of the establishment of the connection with the new connection terminal 300, the reconnections with the existing connection terminals 400 are performed. According to the method of the embodiment, even though the new connection terminal 300 and the existing connection terminals 400 simultaneously start the connection demands with respect to the first internal access point for the connection, it is possible to securely perform the connection with the new connection terminal 300 and it is possible to appropriately perform the reconnections with the existing connection terminals 400. In the method disclosed in JP-A-2015-70556, it is confirmed that one of the existing connection terminals 400 is cut and the reconnection is not performed, and connections with the remaining N−1 terminals may be maintained. Therefore, it is not necessary to consider reconnections at all. That is, in JP-A-2015-70556, a situation is conceivable in which an order of connections (connection priorities) with the existing connection terminals 400 may not be considered at all in a case of the connection with the new connection terminal 300. Therefore, the embodiment includes a method in which, in a situation in which all the existing connection terminals 400 are cut once, the reconnections with the existing connection terminals 400 are taken into consideration while the connection with the new connection terminal 300 is secured, and thus the embodiment is clearly different from JP-A-2015-70556.

Specifically, in a case where the wireless connection with the new connection terminal 300 is started, the processing unit 210 stops the first internal access point which is used for the wireless connections with the plurality of terminal apparatuses 100, and acquires identification information of the new connection terminal 300 using the wireless connection through the second internal access point in a case where the second internal access point, which is different form the first internal access point, is activated. Thereafter, the first internal access point is reactivated, and the wireless connection with the new connection terminal 300 is established based on the identification information. Here, the identification information is information which is capable of uniquely specifying the new connection terminal 300. The identification information is, for example, an MAC address of the new connection terminal 300, and other information may be used.

In this manner, in the wireless connection using the second internal access point, that is, in the temporary connection in which the SSID and the password of the first internal access point are transmitted and received, the electronic apparatus 200 acquires the identification information of the new connection terminal 300. In a case where the identification information acquired in the temporary connection is used, it is determined whether or not the terminal apparatus 100, which performs the connection demand to the first internal access point after reactivation, is the new connection terminal 300.

Furthermore, the processing unit 210 refuses the wireless connections with the plurality of terminal apparatuses 100 (the existing connection terminals 400) until the wireless connection with the new connection terminal 300 is established based on the identification information after the first internal access point is reactivated. That is, based on the identification information, the processing unit 210 determines the terminal apparatus 100 which performs the connection demand, allows the connection in a case of the new connection terminal 300, and refuses the connection in a case of the existing connection terminals 400 (other than the new connection terminal 300). Furthermore, in a case where the connection with the new connection terminal 300 is established, the connections with the existing connection terminals 400 are established according to a normal order (for example, in an order of early connection demands) thereafter.

In this manner, it is possible to realize a process of establishing the wireless connections with the existing connection terminals 400 using the identification information of the new connection terminal 300 after waiting for the establishment of the wireless connection with the new connection terminal 300. Meanwhile, it is possible to acquire the identification information in a case of the temporary connection. That is, in the temporary connection which is performed to transmit the SSID or the like of the first internal access point to the new connection terminal 300, it is possible to receive the identification information. Therefore, it is not necessary to add a new wireless connection in order to transmit and receive the identification information, and thus it is possible to realize the method according to the embodiment with effective configuration and communication control.

Meanwhile, in a narrow sense, in a state in which the terminal apparatuses 100 corresponding to the maximum number of connections (N existing connection terminals 400) perform the wireless connections with the wireless communication unit 220 and the wireless connection with the new connection terminal 300 is started, the processing unit 210 performs a process of cutting the wireless connections with the plurality of terminal apparatuses 100, and establishing the wireless connections with the plurality of terminal apparatuses 100 after waiting for the establishment of the wireless connection with the new connection terminal 300. Furthermore, in a state in which the terminal apparatuses 100 corresponding to the maximum number of connections are performing the wireless connections with the wireless communication unit 220 and the wireless connection with the new connection terminal 300 is started, the processing unit 210 does not perform the process.

That is, the method according to the embodiment is particularly effective in a case where the number of terminals exceeds the maximum number of connections (N) due to addition of the new connection terminal 300. In a case where the number of existing connection terminals 400 does not reach the maximum number of connections, the processing unit 210 skips the process of waiting for the establishment of the wireless connection with the new connection terminal 300. In this case, the sum of the existing connection terminals 400 and the new connection terminal 300 is equal to or smaller than N. Therefore, even though all the apparatuses simultaneously perform connection demands with respect to the first internal access point and the wireless connection is performed in order of earlier connection demand, there is a high possibility that the wireless connection between the electronic apparatus 200 and the new connection terminal 300 is established.

However, in a case where the wireless connection between the electronic apparatus 200 and the new connection terminal 300 is further secured and in in a case where the number of existing connection terminals 400 does not reach the maximum number of connections, a process of establishing the wireless connections with the plurality of terminal apparatuses 100 after waiting for the establishment of the wireless connection with the new connection terminal 300 is not inhibited from being performed. For example, during a period until the first internal access point is reactivated (strictly, during a period until the connection with the new connection terminal 300 is established) after the wireless connection with the new connection terminal 300 is started, there is a possibility that a terminal apparatus 100 (hereinafter, a third terminal apparatus), which is different from the existing connection terminals 400 and the new connection terminal 300, appears.

For example, the third terminal apparatus is an apparatus in which the wireless connection with the electronic apparatus 200 is performed using the first internal access point in the past and is an apparatus which stores the SSID and the password of the first internal access point. According to the terminal apparatus 100, setting is performed in which the connection with respect to an access point is automatically attempted in a case where the access point which has a past connection history is found. In a case where the third terminal apparatus moves to the vicinity of the electronic apparatus 200 during the period until the first internal access point is reactivated, the existing connection terminals 400, the new connection terminal 300, and the third terminal apparatus simultaneously perform the connection demands with respect to the first internal access point, and thus the number of terminals exceeds the maximum number of connections depending on a case. Therefore, in a case where the wireless connections with the existing connection terminals 400 are established after waiting for the establishment of the wireless connection with the new connection terminal 300, it is possible to securely perform the wireless connection with the new connection terminal 300 even under such a situation. Meanwhile, in a case of the method using the identification information according to the embodiment, not only the wireless connections with the existing connection terminals 400 but also the wireless connection with the third terminal apparatus are attempted after waiting for the establishment of the wireless connection with the new connection terminal 300.

Figure 5:
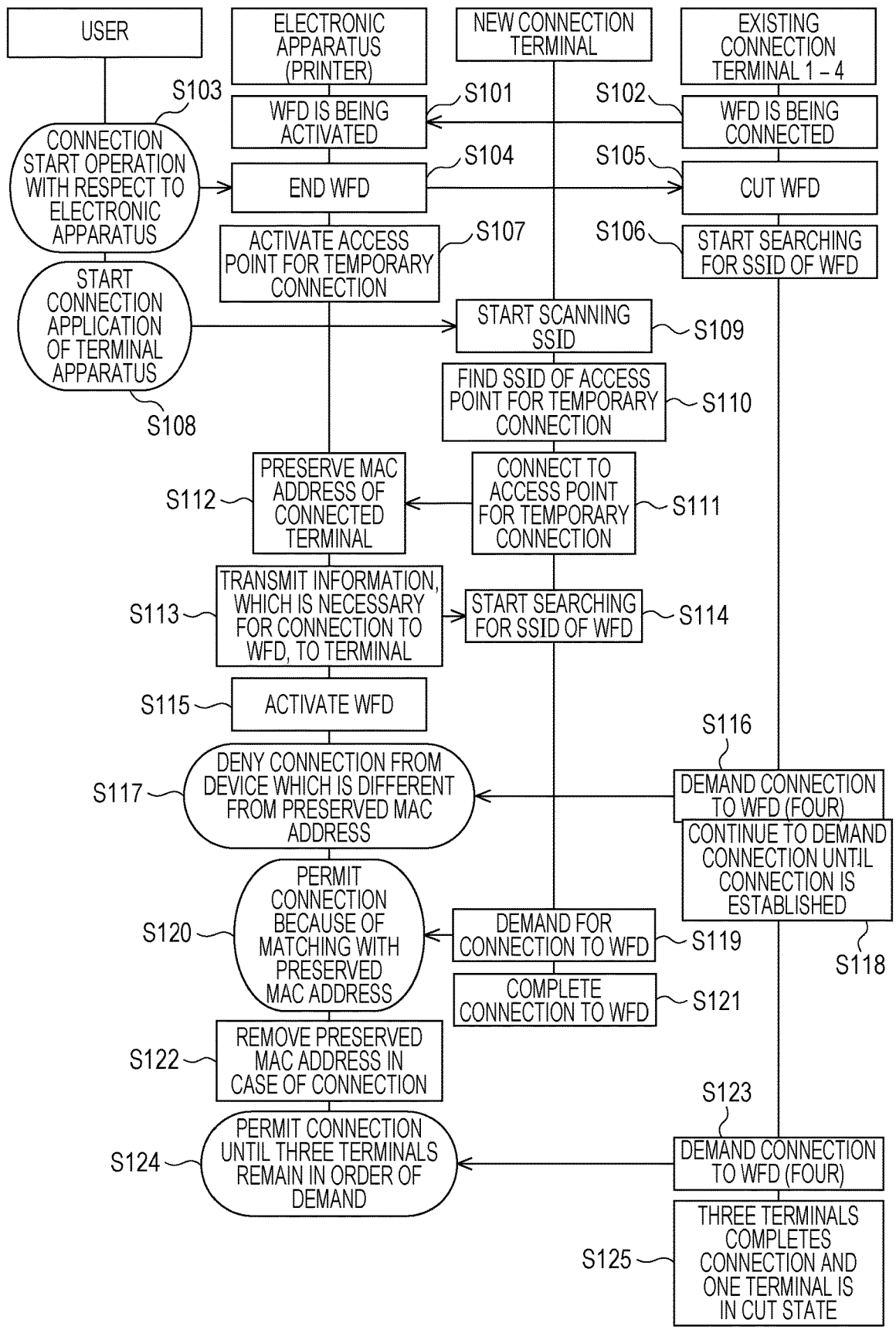
FIG. 5 is a sequence diagram illustrating a process according to the embodiment.

FIG. 5 is a sequence diagram illustrating a process according to the embodiment. Before the connection with the new connection terminal 300 is started, the electronic apparatus 200 is activating the WFD (S101). Specifically, the wireless communication unit 220 of the electronic apparatus 200 is activating the first internal access point. Furthermore, N (FIG. 5 illustrates an example in which N=4) existing connection terminals 400 perform the WFD connections with respect to the first internal access point (S102).

In a case where the connection with the new connection terminal 300 is started, a connection start operation is performed with respect to the electronic apparatus 200 by the user (S103). The electronic apparatus 200 ends the activated WFD (stops the first internal access point) based on the operation in S103 (S104). In accordance with the end of the WFD, the WFD connection is cut in four existing connection terminals 400 (S105), and each of the existing connection terminals 400 starts a process of searching for the SSID of the first internal access point (S106). In addition, after the electronic apparatus 200 stops the first internal access point, the electronic apparatus 200 activates the second internal access point for the temporary connection (S107).

In addition, in a case where the connection with the new connection terminal 300 is started, the connection start operation is performed with respect to the terminal apparatus 100 (the new connection terminal 300) by the user. Specifically, the user performs an operation of starting connection application software previously installed in the new connection terminal 300 (S108).

The connection application software previously includes information (SSID or the like) used for connection with the second internal access point for the temporary connection. Therefore, the processing unit 110 of the new connection terminal 300 starts scanning of the SSID of the second internal access point by performing the operation according to the connection application software (S109). In a case where the SSID of the second internal access point is found (S110), the wireless connection is performed on the second internal access point (S111).

The electronic apparatus 200 stores the MAC address of the new connection terminal 300, which is the terminal apparatus 100 that performs the wireless connection in S111, in a predetermined area of the storage unit 260 (S112). In addition, the electronic apparatus 200 transmits the connection information, which is used for the connection, to the new connection terminal 300 (S113).

Transmission and reception of the information, which is necessary to perform the connection, are completed through the process of S113. Therefore, the new connection terminal 300 cuts the wireless connection with the second internal access point, and starts the process of searching for the SSID of the first internal access point using the information which is transmitted from the electronic apparatus 200 in S113 (S114). In addition, the electronic apparatus 200 stops the second internal access point, and starts the first internal access point for the connection (for the WFD) (S115).

Each of the four existing connection terminals 400 starts searching for the SSID in S106. Therefore, in a case where the first internal access point is activated in S115, each of the existing connection terminals 400 finds the SSID and performs the connection demand with respect to the first internal access point (S116). However, since the MAC address of each of the existing connection terminals 400 is different from the MAC address which is preserved by the electronic apparatus 200 in S112, the electronic apparatus 200 refuses the connection demand from each of the existing connection terminals 400 (S117). Since the wireless connection with the electronic apparatus 200 is not established, each of the existing connection terminals 400 continues the connection demand (S118).

In contrast, the new connection terminal 300 also starts searching for the SSID in S114. In a case where the first internal access point is activated in S115, the new connection terminal 300 finds the SSID and performs the connection demand with respect to the first internal access point (S119). Since the MAC address of the new connection terminal 300 coincides with the MAC address which is preserved by the electronic apparatus 200 in S112, the electronic apparatus 200 allows the connection demand from the new connection terminal 300 (S120), and thus the WFD connection is established between the new connection terminal 300 and the electronic apparatus 200 (S121).

The order of the connection demands of the new connection terminal 300 and the four existing connection terminals 400 differs according to the situation. However, regardless the order of the connection demands, the connection with the new connection terminal 300 is established before the connections with the existing connection terminals 400 are established in a case where the processes illustrated in S116 to S121 are performed, and thus it is possible to securely perform the wireless connection between the new connection terminal 300 and the electronic apparatus 200.

In addition, in a case where the connection with the new connection terminal 300, which corresponds to the MAC address preserved in S112, is established, the electronic apparatus 200 removes the MAC address (S122). In a case where the existing connection terminals 400 perform the connection demands to the electronic apparatus 200 after the MAC address is removed (S123), the electronic apparatus 200 allows the connections in order of the connection demands until reaching the maximum number of connections without determining whether or not the MAC address coincides (S124). In the example of FIG. 5, the maximum number of connections is 4 and the connection with the new connection terminal 300 is completed in S121, and thus the connection demands are allowed up to three connection terminals in S124. Therefore, the connections with three of the four existing connection terminals 400 are completed, and a remaining one terminal is in a cut state (S125).

3. Modification Example

Hereinafter, some modification examples will be described.

In FIG. 5, the electronic apparatus 200 changes a process with respect to the connection demand based on whether or not the MAC address is stored. Furthermore, in a case where the MAC address is stored, the connection demand from the terminal apparatus 100 which has a different MAC address is refused as illustrated in S117. In addition, in FIG. 5, the MAC address, which is stored once, is not removed until a connection from the terminal apparatus 100 (new connection terminal 300), which has a coinciding MAC address, is performed. However, it may be considered that there is also a case where the connection with the new connection terminal 300 is not normally performed after the MAC address is stored in S112. For example, a case may be considered where the new connection terminal 300 stops an operation due to failure or a worn-out battery after the process of S112 is performed. In this case, since the connection demand in S119 is not performed, the process of S122 is not performed, and thus the MAC address continues to remain in the storage unit 260. As a result, the processes of S116 to S118 are repeated, and thus it is not possible for the existing connection terminals 400, which have the different MAC addresses, to perform the WFD connection with the electronic apparatus 200 no matter how much time passes.

Accordingly, in a case where given conditions are satisfied, the processing unit 210 allows the establishment of the wireless connections with the plurality of terminal apparatuses 100 (the existing connection terminals 400) even before the wireless connection with the new connection terminal 300 is established. In this manner, even in a case where the wireless connection with the new connection terminal 300 is not established due to abnormalities, it is possible to perform reconnections between the existing connection terminals 400 and the electronic apparatus 200.

Here, in a case where elapsed time, which is taken from predetermined timing after the first internal access point is reactivated to timing at which the wireless connection with the new connection terminal 300 is established, exceeds a threshold, the given condition is satisfied. Otherwise, in a case where a degree, in which the terminal apparatus 100 (any one of the existing connection terminals 400) performs the connection demand to the electronic apparatus 200 after the first internal access point is reactivated, exceeds the threshold, the given condition is satisfied.

For example, the predetermined timing after the first internal access point is reactivated may be timing at which the first internal access point is reactivated (S115 of FIG. 5) by the electronic apparatus 200, may be timing at which an initial connection demand is performed from the existing connection terminal 400 after the first internal access point is reactivated, or may be another timing. In a case where the new connection terminal 300 is normally operated, a search for the SSID of the first internal access point is started in S114 of FIG. 5, and thus it is considered that time, which is taken until the connection demand in S119 and completion of the connection, is not extremely long. That is, in a case where the elapsed time from the predetermined timing too long, it is determined that some abnormalities are generated in communication with the new connection terminal 300, the wireless connections with the existing connection terminals 400 are allowed without waiting for the establishment of the connection with the new connection terminal 300. For example, in a case where a given threshold is set and the elapsed time from the predetermined timing is equal to or larger than the threshold, the establishment of the wireless connections with the existing connection terminals 400 is allowed.

In addition, the degree, in which the terminal apparatus 100 performs the connection demand to the electronic apparatus 200, is for example, the accumulated number of times that the connection demands are performed by the existing connection terminals 400. Here, the accumulated number of times may be counted for each of the plurality of existing connection terminals 400, or may be counted by adding up the connection demands of all the existing connection terminals 400. In a case where the accumulated number of times that the connection demands are performed is large, long time elapses while the connection with the new connection terminal 300 is not established. Accordingly, in this case, a threshold of the accumulated number of times is set, and the establishment of the wireless connection with the existing connection terminal 400 is allowed in a case where the accumulated number of times is equal to or larger than the threshold.

Figure 6:
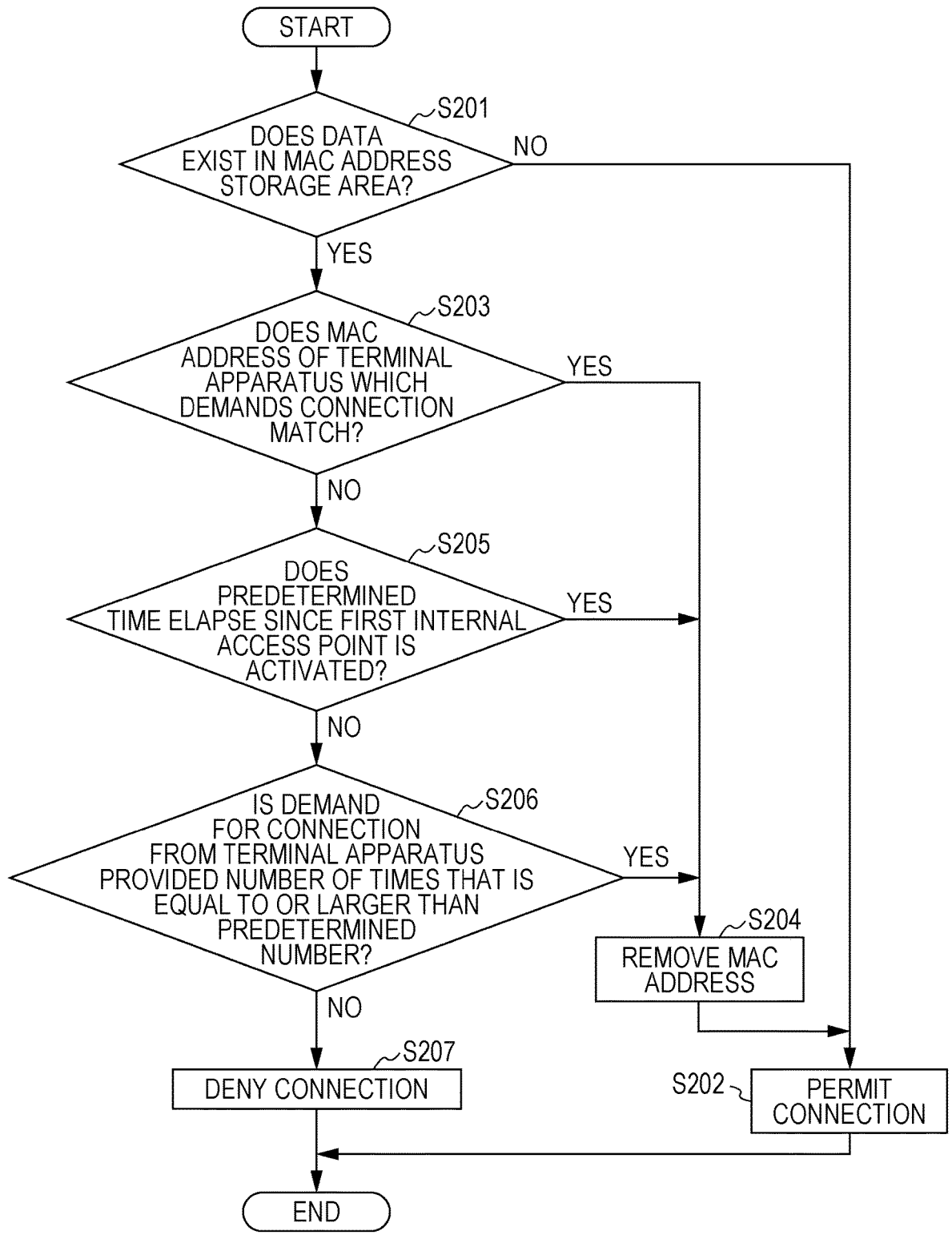
FIG. 6 is a flowchart illustrating a connection determination based on identification information.

FIG. 6 is a flowchart illustrating an operation in a case where the electronic apparatus 200 receives a connection demand from the given terminal apparatus 100. In a case where the connection demand is received, the processing unit 210 of the electronic apparatus 200 determines whether or not the MAC address is stored in the predetermined area of the storage unit 260 (S201). In a case where the MAC address is not stored (No in S201), the processing unit 210 allows a connection from the terminal apparatus 100 (S202). A case of No in S201 corresponds to, for example, a state in which the wireless connection with the new connection terminal 300 is normally completed and the connection demands are performed from the existing connection terminals 400.

In a case where the MAC address is stored (Yes in S201), it is determined whether or not the MAC address of the terminal apparatus 100, which performs the connection demand, coincides with the MAC address which is stored in the storage unit 260 (S203). In a case where the MAC addresses coincide with each other (Yes in S203), the terminal apparatus 100 which performs the connection demand is the new connection terminal 300. Therefore, the stored MAC address is removed (S204), and the connection is allowed (S202). Meanwhile, the process of S204 may be performed after the process of S202.

In a case where the MAC addresses do not coincide with each other (No in S203), it is possible to estimate that the terminal apparatus 100 which performs the connection demand is the existing connection terminal 400. Accordingly, the given condition is determined, and it is determined whether or not to allow the connection. Specifically, whether or not predetermined time elapses after the first internal access point is started (S205). In a case where the predetermined time elapses (Yes in S205), the given condition is satisfied, and thus the MAC address is removed (S204) and the connection is allowed (S202).

In a case of No in S205, it is determined whether or not the connection demand from the terminal apparatus 100 is performed the number of times which is equal to or larger than a predetermined number (S206). In a case where the connection demand is performed the number of times which is equal to or larger than the predetermined number (Yes in S206), the given condition is satisfied. Therefore, the MAC address is removed (S204) and the connection is allowed (S202). In a case of No in S206, the given condition is not satisfied. Therefore, the connection demand from the terminal apparatus 100 is refused (S207).

Meanwhile, although FIG. 6 illustrates an example in which both the elapsed time (waiting time) and the degree of the connection demand are used as the given condition, any one of them may be used. In addition, a fact that it is possible to perform various modifications on the elapsed time (waiting time) and the degree of the connection demand is as described above.

In addition, as illustrated in FIG. 1, it is possible to apply the method according to the embodiment to the communication system 10 which includes the electronic apparatus 200 and the new connection terminal 300 (terminal apparatus 100).

In addition, the terminal apparatus 100 (new connection terminal 300) and the electronic apparatus 200 according to the embodiment may realize a part or most of the process using a program. In this case, in a case where a processor, such as a CPU, executes the program, the terminal apparatus 100 or the like according to the embodiment is realized. Specifically, a program, which is stored in a non-temporary information store medium, is read, and the read program is executed by the processor such as the CPU. Here, an information storage medium (computer-readable medium) stores a program, data, and the like, and it is possible to realize a function thereof is realized by an optical disk (a DVD, a CD, or the like), a Hard Disk Drive (HDD), a memory (a card-type memory, a ROM, or the like), or the like. Furthermore, the processor, such as the CPU, performs the various processes according to the embodiment based on the program (data) stored in the information storage medium. That is, the information storage medium stores a program (a program used to cause a computer to perform the processes of the respective units) used to cause the computer (a device which includes an operation unit, a processing unit, a storage unit, and an output unit) to function as the respective units according to the embodiment.

In addition, in a state in which wireless connections with the plurality of terminal apparatuses 100 (the existing connection terminals 400) are established and the wireless connection with the new connection terminal 300, which is different from the plurality of terminal apparatuses 100, is started, it is possible to apply the method according to the embodiment to a wireless communication method including cutting the wireless connections with the plurality of terminal apparatuses 100, and establishing the wireless connections with the plurality of terminal apparatuses 100 after waiting for the establishment of the wireless connection with the new connection terminal 300.

Hereinabove the embodiments, to which the invention is applied, and the modification example thereof are described. However, the invention is not limited to each of the embodiments and the modification example at it is, and it is possible to modify and specify components in a range without departing from the gist of the invention in execution steps. In addition, in a case where the plurality of components, which are disclosed in each of the above-described embodiments and the modification example, are appropriately combined, it is possible to form various inventions. For example, some components may be removed from the whole components disclosed in each of the above-described embodiments and the modification example. Furthermore, the components described in the different embodiments and modification example may be appropriately combined. In addition, in the specification or the drawings, it is possible to replace terms, which are described together with further broader or synonymous different terms at least once, by the different terms in either the specification or the drawings. As above, various modifications and applications are possible in a range without departing from the gist of the invention.

The entire disclosure of Japanese Patent Application No. 2017-177371, filed Sep. 15, 2017 is expressly incorporated by reference herein.

What is claimed is:

1. An electronic apparatus comprising:
   a wireless communication unit that performs wireless communication; and
   a processing unit that controls the communication of the wireless communication unit, wherein, when in a state in which the wireless communication unit performs wireless connections with a plurality of terminal apparatuses, an operation is performed for establishing a wireless connection with a new connection terminal, which is different from the plurality of terminal apparatuses is performed, the processing unit cuts the wireless connections with the plurality of terminal apparatuses, and establishes the wireless connections with the plurality of terminal apparatuses after waiting for establishment of the wireless connection with the new connection terminal; and
   wherein the processing unit
      stops a first internal access point used for the wireless connections with the plurality of terminal apparatuses in a case where the wireless connection with the new connection terminal is started,
      acquires identification information of the new connection terminal using wireless connection performed by a second internal access point in a case where the second internal access point, which is different from the first internal access point, is activated, and
      reactivates the first internal access point and establishes the wireless connection with the new connection terminal based on the identification information.

2. The electronic apparatus according to claim 1, wherein the processing unit refuses the wireless connections with the plurality of terminal apparatuses until the wireless connection with the new connection terminal is established based on the identification information after the first internal access point is reactivated.

3. The electronic apparatus according to claim 1,
wherein the processing unit allows the wireless connections with the plurality of terminal apparatuses to be established even before the wireless connection with the new connection terminal is established in a case where a given condition is satisfied.

4. The electronic apparatus according to claim 3,
wherein the given condition is satisfied in a case where elapsed time, which is taken from predetermined timing after the first internal access point is reactivated to timing at which the wireless connection with the new connection terminal is established, exceeds a threshold, or in a case where a degree, in which the terminal apparatuses perform connection demands with respect to the electronic apparatus after the first internal access point is reactivated, exceeds the threshold.

5. The electronic apparatus according to claim 1,
wherein the wireless communication is Wi-Fi Direct (WFD) type communication.

6. The electronic apparatus according to claim 1,
wherein, when in a state in which the terminal apparatuses reaching a maximum number of connections perform the wireless connections with the wireless communication unit, an operation for establishing a wireless connection with the new connection terminal is performed such that the processing unit performs a process of cutting the wireless connections with the plurality of terminal apparatuses, and establishing the wireless connections with the plurality of terminal apparatuses after waiting for the establishment of the wireless connection with the new connection terminal, and wherein, when in a state in which the terminal apparatuses reaching the maximum number of connections do not perform the wireless connections with the wireless communication unit, an operation for establishing a wireless connection with the new connection terminal is performed such that the processing unit does not perform the process.

7. A communication system comprising:
the electronic apparatus according to claim 1; and
the new connection terminal.

8. A wireless communication method, in a state in which wireless connections with a plurality of terminal apparatuses are established, an operation is performed for establishing a wireless connection with a new connection terminal, which is different from the plurality of terminal apparatuses, the method comprising:
cutting the wireless connections with the plurality of terminal apparatuses; and
establishing the wireless connections with the plurality of terminal apparatuses after waiting for establishment of the wireless connection with the new connection terminal,
wherein cutting the wireless connections with the plurality of terminal apparatuses and establishing the wireless connections with the plurality of terminal apparatuses after waiting for establishment of the wireless connection with the new connection terminal further comprises:
stopping a first internal access point used for the wireless connections with the plurality of terminal apparatuses in a case where the wireless connection with the new connection terminal is started,
acquiring identification information of the new connection terminal using wireless connection performed by a second internal access point in a case where the second internal access point, which is different from the first internal access point, is activated, and
reactivating the first internal access point and establishes the wireless connection with the new connection terminal based on the identification information.

* * * * *